No. 726,203. PATENTED APR. 21, 1903.
H. THIEMANN.
WATER LEVEL INDICATOR FOR STEAM GENERATORS.
APPLICATION FILED MAY 26, 1902.
NO MODEL. 2 SHEETS—SHEET 1.

Witnesses:
George Gustav Schoenlank
Thos. Kirkpatrick

Inventor
Heinrich Thiemann
by Alexander & Co.
Attorneys

No. 726,203. PATENTED APR. 21, 1903.
H. THIEMANN.
WATER LEVEL INDICATOR FOR STEAM GENERATORS.
APPLICATION FILED MAY 26, 1902.
NO MODEL. 2 SHEETS—SHEET 2.

Witnesses:
George Gustav Schoenlank
Thos. Kirkpatrick

Inventor
Heinrich Thiemann
by Alexander & Co.
Attorneys

UNITED STATES PATENT OFFICE.

HEINRICH THIEMANN, OF STOLP, GERMANY.

WATER-LEVEL INDICATOR FOR STEAM-GENERATORS.

SPECIFICATION forming part of Letters Patent No. 726,203, dated April 21, 1903.

Application filed May 26, 1902. Serial No. 109,081. (No model.)

*To all whom it may concern:*

Be it known that I, HEINRICH THIEMANN, a subject of the King of Prussia, Emperor of Germany, residing at 17 Kirchplatz, Stolp, in the Kingdom of Prussia and Empire of Germany, have invented new and useful Improvements in and Relating to Water-Level Indicators of Steam-Generators, of which the following is a specification.

My invention relates to water-level indicators of steam-generators, and has for its object to provide, in connection with a water-gage, a device which indicates whether the water-level in the generator has descended below the lowest point admissible in order to attract the attention of the stoker, and thus prevent the explosion of the generator through a deficiency of water. This object is achieved by connecting with the lower tube of the water-gage a dropping-cock, through which water is allowed to pass continually from the generator, the water-level in the latter being shown to have sunk too low in case the dropping should cease. The gage-glass is prolonged upward above the top of the generator-shell to obviate the filling of such glass through the condensation of steam therein when the upper or lower tube of the gage should become choked and create the false appearance of the generator being full of water, while in reality the level has sunk to a dangerous depth.

In the accompanying drawings I have represented a constructional form of the invention.

Figure 1:
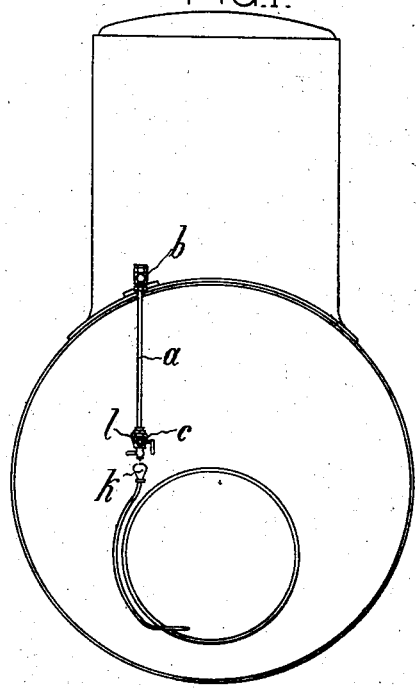
Figure 2:
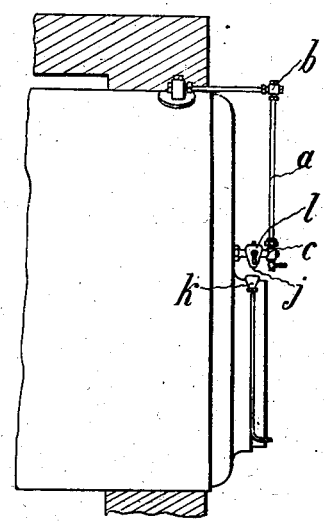
Figure 3:
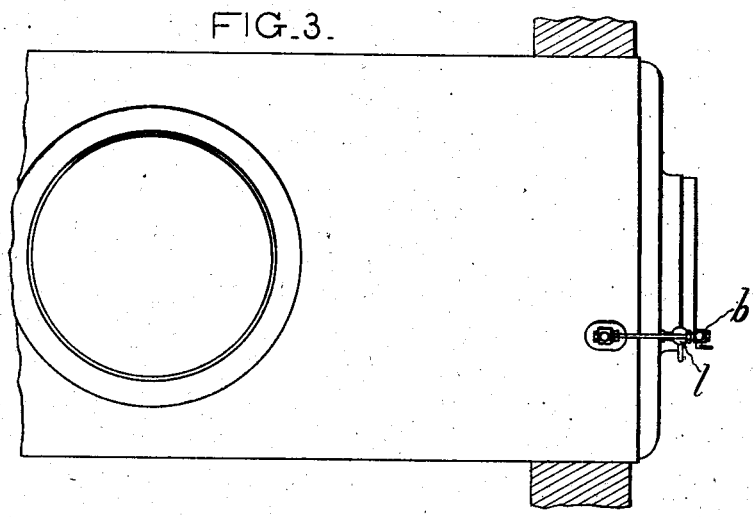
Figure 4:
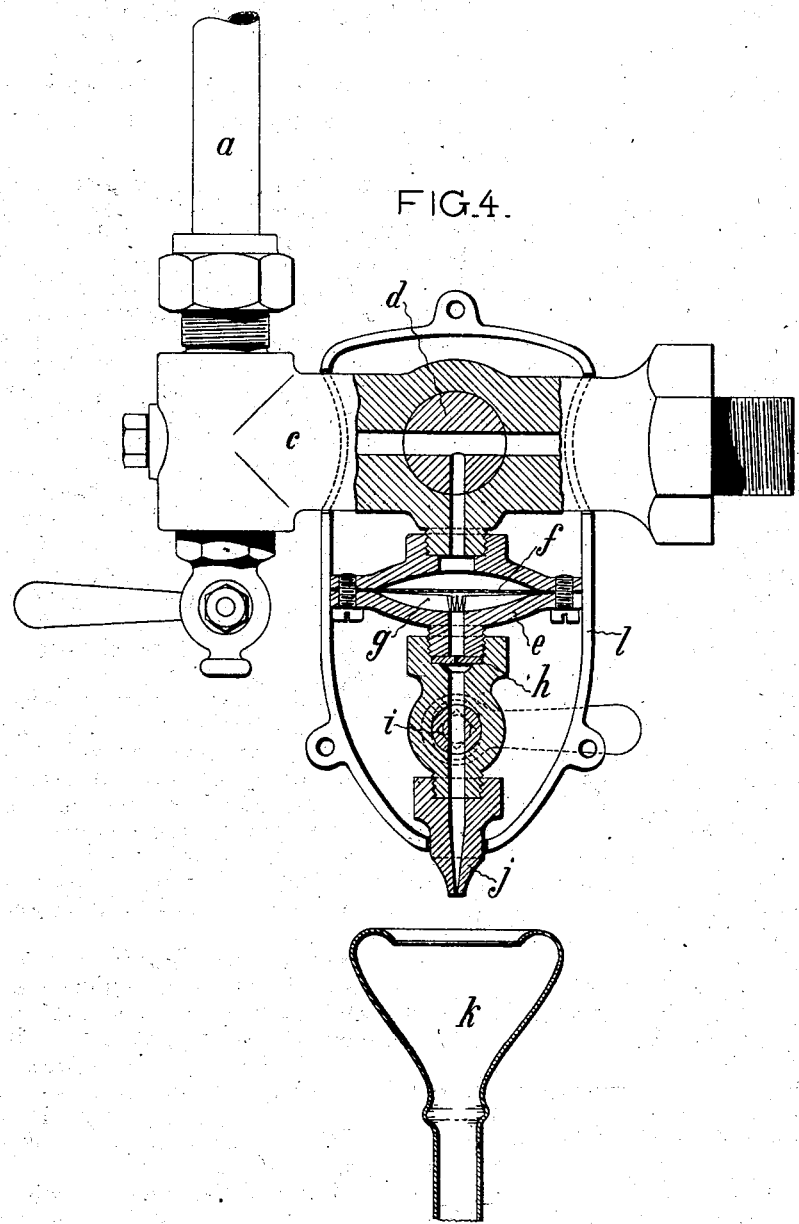

Figure 1 is a front elevation, Fig. 2 a side elevation, and Fig. 3 a plan, of a generator to which the water-level indicator is applied. Fig. 4 shows the dropping device attached to the lower tube of the water-gage.

On reference to Figs. 1 to 3 it will be seen that the gage-glass $a$ is connected through the upper tube $b$ of the gage, all the bores of which are straight to facilitate cleaning, with the steam-space of the generator at the top of the latter, while the lower tube $c$ of the gage is joined to the water-space of the boiler. The stop-cock $d$ in the lower tube $c$ of the gage is a three-way cock, which in the position shown sets the bore in the tube and the water-space of the generator in communication with the dropping-cock. To the tube of the gage is joined a box $e$, adapted to hold a sieve $f$ upon radial ribs $g$ in order to retain impurities. Below the box $e$ is arranged a dropping-plate $h$, which has a small aperture therein and to which the dropping-cock $i$ is joined. This dropping-cock terminates below in the nozzle $j$, having a larger bore or aperture than the dropping-plate $h$. As the water drops down it is caught up by a cup $k$ and conducted to the ash-pit.

In order to obviate the condensation of the steam in the dropping device, this device is inclosed in a casing $l$, so that at low-water level steam will pass from the nozzle $i$. The casing $l$ is formed in two halves secured together and formed with recesses at their upper ends to embrace the lower tube $c$ and recessed at their lower ends for the passage of the nozzle $j$.

What I claim as my invention, and desire to secure by Letters Patent, is—

1. The combination with a water-gage, of a water-level indicator connected thereto and comprising a dropping mechanism having a diaphragm or plate provided with a small aperture to discharge water in drops so long as the proper amount of water remains in the boiler and thereby form a visual indicator or signal.

2. The combination in a water-gage, of a water-dropping mechanism at the lower end thereof separate and independent of the usual blow-off cock and adapted to discharge drops of water so long as the proper amount of water remains in the boiler, and an air-containing casing surrounding said dropping mechanism to prevent the condensation of steam therein.

3. In a water-level indicator the combination, with the lower tube of the water-gage, of a three-way stop-cock, a box connected therewith a sieve held in said box, a dropping-plate secured to this box and a cock, substantially as described.

4. In a water-level indicator the combination, with the lower tube of the water-gage, of a three-way stop-cock, a box connected therewith and furnished interiorly with ribs, a sieve held in said box, a dropping-plate secured to this box and having a small aperture therein a cock furnished with a nozzle having a wider aperture than that in the dropping-plate and a casing, substantially as described.

5. The combination in a water-gage, of a dropping-cock, comprising a chamber or box, an apertured dropping-plate at the lower side of said chamber or box and provided with a discharge-passage below the said apertured plate.

6. The combination in a water-gage, of a dropping-cock, comprising a chamber or box, a sieve or strainer therein, an apertured plate below the sieve or screen and a cock below the apertured plate.

7. In a water-gage, a dropping-cock comprising a chamber or box adapted for connection with said gage, an apertured dropping-plate at the lower or outlet end of said chamber or box and a discharge-nozzle below said plate and having a bore of greater diameter than the aperture in the plate.

In testimony whereof I have signed my name to this specification in the presence of two subscribing witnesses.

HEINRICH THIEMANN.

Witnesses:
GEORG RISTER,
OTTO DICK.